Patented Oct. 17, 1933

1,931,265

UNITED STATES PATENT OFFICE 1,931,265

PROCESS OF PREPARING ARYLAMINO-ANTHRAQUINONE BODIES

Walter C. Meuly, Milwaukee, Wis., assignor, by mesne assignments, to E. I. du Pont de Nemours & Company, a corporation of Delaware No Drawing. Application January 12, 1931
Serial No. 508,373

19 Claims. (Cl. 260—60)

This invention relates to a process of preparing arylamino-anthraquinone bodies by condensing unsulfonated halogen-anthraquinone bodies with unsulfonated arylamines, whereby hydro-halic acid is eliminated and arylamino-anthraquinone bodies are produced. More particularly, my invention comprises an improved process for effecting the condensation of halogen-anthraquinone compounds having an auxochromic group in the same nucleus in which the halogen atom is located, with unsulfonated arylamines typified by p-toluidine, in the presence of acid-absorbing agents and catalysts.

It is an object of my invention to provide an improved process of preparing arylamino-anthraquinone bodies according to which the yield of the desired product is increased, while at the same time the cost of the initial materials is reduced and operation on a large scale facilitated.

Other and further important objects of my invention will become apparent as the description proceeds.

My invention will probably be best understood and a description of it simplified by reference more particularly to a typical reaction involving the condensation of an unsulfonated 1-amino-4-bromo-anthraquinone body with an unsulfonated arylamine, for instance p-toluidine. It will be understood, however, that my invention is not confined to a process employing this particular type of anthraquinone body, but that the process may be extended to include the use of other halogen anthraquinone bodies. In general, the anthraquinone bodies to which my invention is limited are characterized by containing one or more reactive halogen atoms, the reactivity of which is determined by the presence of an auxochromic group (hydroxy (OH) group or primary, secondary, or tertiary amino group) in the same nucleus as the halogen atom.

The condensation of unsulfonated 1-amino-4-bromo-anthraquinone bodies with unsulfonated arylamines has been carried out in the art by heating the two compounds together at elevated temperatures in the presence or absence of acid absorbing agents, such as sodium acetate, and sometimes in the presence of a catalyst, for instance a copper compound. References to the literature on this subject may be found in Houben, Anthracen und die Anthrachrione, Leipzig, 1929, (page 423). While the condensation of the corresponding sulfonated anthraquinone bodies and the corresponding sulfonated arylamines has been effected by heating the reactants in aqueous medium, it appears from the art that the reaction between the unsulfonated bodies has never been carried out in the presence of water. It seems to have been the belief among those skilled in the art that the presence of water would prevent the reaction.

In British Patents 271,602 and 308,049, it has been suggested to use as acid absorbing agent in this reaction crystalline sodium or potassium acetate, or a mixture of anhydrous or partially anhydrous sodium acetate, with the corresponding amount of water required to form the equivalent of sodium acetate having its normal water of crystallization content. The object evidently was to facilitate fusion of the mixture, since in these patents sodium acetate is used as a flux for the entire mixture and it is known that crystalline sodium acetate will fuse more readily and at lower temperatures than the anhydrous variety. The earlier of these British patents states that "moisture present in the arylamine used is not detrimental" but it obviously speaks of very small proportions of moisture and furthermore it conducts the entire reaction at a temperature (110° C.) sufficiently high to boil off not only all of the free water but also a part of the water of crystallization. It is thus clear that like all their predecessors in the art these patentees considered water in the condensation reaction, at best, as something harmless but perfectly superfluous.

I have now found that if the reaction between an unsulfonated anthraquinone body containing a reactive halogen atom and an unsulfonated arylamine is carried out, not merely in the presence of traces of moisture or water of crystallization of the acid-absorbing agent, but in the presence of large quantities of water, or a quantity at least sufficient to dissolve the entire acid-absorbing agent at room temperature, the reaction is facilitated in a manner hitherto unknown and unforeseen.

One of the principal advantages of the use of water in the above reaction is that it makes possible the introduction of various acid-absorbing agents, novel to this reaction, and hitherto not applicable because of their tendency to volatilize or decompose when heated in the absence of water. I have found that some of these novel acid-absorbing agents are chemically superior to the alkali-metal-acetates hitherto used in this reaction, since they produce a higher yield of the condensation product. Examples of such novel and improved acid-absorbing agents are ammonium salts of weak, particularly organic acids, and substances such as soaps, or Turkey-red oil, which, in addition to being salts of weak acids, are characterized by distinctive emulsifying properties.

A further valuable advantage of the use of water is that in the case of some anthraquinone bodies the presence of water increases the yield of the condensation product even if the heretofore customary sodium or potassium acetate be used as the acid-absorbing agent. This, for instance, is the case with 1-amino-2,4-dibromo-anthraquinone and p-toluidine. (See Ex. 6 below). This effect is again surprising and could not be foreseen.

A still further valuable advantage of the use of water is that the quantity of acid-absorbing agent can be cut down considerably, since its sole purpose is now to absorb the acid liberated in the reaction, the water furnishing the fluid medium to suspend the reactants, and there being, therefore, no necessity for using very large excesses of an alkali-metal-acetate to act as a flux. The substitution of water for excess sodium or potassium acetate clearly effects a considerable saving when the invention is practiced on a large scale, and reduces the cost of the final product.

A still further advantage of the use of water is that one may start with the anthraquinone body in paste form, directly as it is obtained in the process of its manufacture. The step hitherto invariably practiced in the art, of drying the paste is thus eliminated. Similarly, the acid-absorbing agent may be used in solution, and there is no necessity of starting with the dry form.

A still further advantage of major importance flowing from the use of water is that its use facilitates control of the reaction on a large scale and eliminates the danger of overheating. Experience has shown that the yield and purity of the condensation product obtained by high temperature condensation may be considerably reduced by overheating, due to the resulting formation of by-products. In the present invention, the reaction is carried out in an aqueous medium, preferably under a reflux column, whereby the temperature is prevented from rising above about 101–102° C.

A still further advantage of the use of water is that the injurious catalytic effect of traces of metal upon the reaction is thereby eliminated. In the ordinary high-temperature condensation process traces of metal such as copper or iron interfere seriously with the reaction and cut down the yield of the condensation product. Such traces of metal are difficult to eliminate using technical starting materials and large-scale apparatus. In my novel process such traces of metal are not injurious.

Other and further substantial advantages of my improved process will be apparent from the specific examples submitted below.

As stated above, the use of water as a suspension medium for the reacting ingredients enables the use of other acid-absorbing agents than the conventional alkali-metal acetates. By experimental research I have found that ammonium salts of weak acids are considerably superior in this reaction to the corresponding sodium or potassium salts, giving consistently higher yields of the condensation product. Particularly beneficial for this purpose are ammonium salts of organic carboxylic acids.

I have further found that soaps and substances in general possessing emulsifying or dispersing properties are particularly advantageous as acid-absorbing agents, producing high yields of the condensation product. Examples of such bodies are ordinary soap, Turkey-red oil and ammonium abietate. The special advantage of bodies of the latter type is that in addition to absorbing efficiently the liberated hydro-halic acid by virtue of their mildly alkaline properties, they accelerate the reaction because of their emulsifying action.

The following table illustrates the above facts quantitatively. This table sets forth the yields obtained by varying the acid-absorbing agent in the condensation of 1-amino-2,4-dibromo-anthraquinone with p-toluidine, in aqueous suspension, and in the presence of copper acetate as a catalyst.

| Acid absorbing agent | Yield |
|---|---|
| | Percent |
| Ammonium acetate | 95 |
| Potassium acetate | 88 |
| Sodium acetate | 84 |
| Magnesium acetate | 82 |
| Calcium acetate | 81 |
| Ammonium formate | 88 |
| Sodium formate | 72 |
| Ammonium carbonate | 67 |
| Sodium carbonate | Nil |
| Calcium carbonate | 61 |
| Magnesium carbonate | 42 |
| Ammonium borate | 50 |
| Sodium borate | Nil |
| Ammonium abietate | 88 |
| Sodium abietate | 81 |
| Castile soap | 95 |
| Turkey-red oil | 91 |

Without limiting my invention, the following specific examples are given for the purpose of better illustrating the same. The parts given are parts by weight.

Example 1

50 parts of glacial acetic acid are diluted with about 300 parts of water. The mixture is neutralized by adding about 55 parts of aqueous ammonia (26%). To the ammonium-acetate solution thus prepared are added 100 parts of 1-amino-3,4-dibromo-anthraquinone, dry or in paste form, 1 part of copper acetate and 500 parts of p-toluidine. The temperature is raised to reflux conditions (about 101° C.) and maintained there for about 4 hours.

The reaction product is best isolated by diluting the reaction mass with about 500 parts of alcohol and subsequently filtering. The product, after being freed from adhering p-toluidine by washing with alcohol, is obtained in the form of large shiny black crystals and represents 1-amino-2-bromo-4-p-tolylamino-anthraquinone in a high state of purity and in a yield of about 95% of theory. Direct sulfonation of this product yields Alizarine sky blue B of excellent purity (Color Index 1088).

The p-toluidine of Example 1 may be replaced by other arylamines. If, for example, 500 parts of aniline are used in place of 500 parts of p-toluidine the reaction product will be 1-amino-2-bromo-4-phenylamino-anthraquinone of excellent purity and practically theoretical yield.

Example 2

To a solution containing about 70 parts of ammonium acetate in about 200 parts of water (prepared in a manner similar to Example 1) are added 100 parts of 1-amino-2-methyl-4-bromo-anthraquinone, dry or in paste form, 3 parts of copper acetate and 500 parts of p-toluidine. The temperature is raised to the reflux temperature of the mixture (about 102° C.) and maintained for about 4 hours. The reaction is now complete and the product may be isolated in the same manner as in Example 1. It is thus obtained in the form of large, shiny crystals and represents 1-amino-2-methyl-4-p-tolylamino-anthraquinone in a state of high purity. The yield is over 90% of theory. The product is suitable to be directly converted by sulfonation into Cyananthrol R of excellent purity (Color Index No. 1076).

Example 3

If the conditions of Example 2 are applied to 100 parts of 1-methylamino-4-bromo-anthraquinone instead of 100 parts of 1-amino-2-methyl-4-bromo-anthraquinone, the condensation will proceed in an analogous manner and the reaction product will be found to be 1-methyl-amino-4-p-tolylamino-anthraquinone in a high state of purity and in a yield of at least 90% of theory. This product can be converted through sulfonation into Alizarine astrol B (Color Index 1075) of high purity.

Example 4

If the conditions of Example 2 are applied to 100 parts of 1-p-tolylamino-dibromo-anthraquinone (obtained by dibromination of 1-p-tolylamino-anthraquinone) the reaction product as shown by analysis is di-p-tolylamino-bromo-anthraquinone. Upon sulfonation it is converted into a dyestuff that dyes wool and silk from an acid bath in green shades, considerably more yellowish than Quinizarine green (Color Index 1078), and very fast to light and to washing.

Example 5

If the conditions of Example 2 are applied to 100 parts of 1,5-diamino-2,4,6,8-tetra-bromo-anthraquinone, the reaction product consists of 1,5-diamino-2,6-dibromo-4,8-di-p-tolylamino-anthraquinone in excellent yield and high state of purity, and is suitable to be converted by direct sulfonation into Anthraquinone blue S R extra (Color Index 1089) of very high purity.

Example 6

60 parts of sodium acetate (crystals), 200 parts of water, 100 parts of 1-amino-2,4-dibromo-anthraquinone, 2 parts of copper acetate and 500 parts of p-toluidine are mixed together and heated to the boiling temperature of the mixture (about 102° C.) and refluxed for about 5 hours. The reaction product is preferably isolated according to the method of Example 1 and represents 1-amino-2-bromo-4-p-tolylamino-anthraquinone in a high state of purity and in a yield of about 84% of theory. If the 60 parts of sodium acetate crystals are replaced by 60 parts of anhydrous potassium acetate, the reaction proceeds in an analogous manner and the yield will be about 4% higher.

Example 7

50 parts of formic acid 90% are diluted with 250 parts of water and neutralized with about 70 parts of 26% aqueous ammonia solution. To the ammonium formate solution thus prepared are added 100 parts of 1-amino-2,4-dibromo-anthraquinone, 2 parts of copper acetate and 500 parts of p-toluidine. The condensation is carried out and the reaction product is isolated in an analogous manner to that described in Example 1. The yield of the 1-amino-2-bromo-4-p-tolylamino-anthraquinone is about 87% of theory. If the ammonium formate solution is replaced by 60 parts of sodium formate in 200 parts of water the yield is about 72% of theory, but the high purity of the product remains the same.

Example 8

A soap solution is prepared by dissolving 80 parts of castile soap in 250 parts of water. To this are added 100 parts of 1-amino-2,4-dibromo-anthraquinone, 1 part of copper acetate and 300 parts of p-toluidine. The temperature is raised to the reflux temperature of the mixture (about 100° C.). After 5 to 10 minutes boiling the reaction product separates out in large shiny crystals and the reaction is evidently complete in about 15 minutes. The isolation of the product is carried out as in Example 1. The 1-amino-2-bromo-4-tolylamino-anthraquinone thus obtained is of very high purity and the yield is about 95% of theory.

Example 9

If in Example 8 instead of a soap solution, a solution of 100 parts of Turkey red oil in 100 parts of water is used, the reaction will proceed in a similar way and the product obtained will be of the same high purity as in Example 8, the yield being at least 90% of theory.

Example 10

A solution of ammonium abietate is prepared by dissolving 100 parts of rosin (about 90% abietic acid) in about 150 parts of water and 25 parts of 26% aqueous ammonia solution. If the resulting solution is used in place of the soap solution in Example 8, the reaction can be carried out in an entirely similar manner and the yield of 1-amino-2-bromo-4-p-tolylamino-anthraquinone will be about 88% of theory.

Example 11

To a solution containing about 70 parts of ammonium acetate in about 200 parts of water are added 100 parts of 1-amino-2,4-dibromo-anthraquinone, 2 parts of copper acetate, 200 parts of p-toluidine and 200 parts of a petroleum hydrocarbon, preferably a fraction boiling between 100 and 200° C. The mixture is heated to reflux temperature (about 101 to 104° C.) and refluxed for about 5 hours. The reaction is allowed to cool to about 50° C. and filtered. The crystals are washed with about 300 to 500 parts of the same hydrocarbon, preferably at slightly elevated temperatures (about 50° C.). The reaction product thus obtained is 1-amino-2-bromo-4-tolylamino-anthraquinone in a state of high purity and in a yield of about 90 to 95% of theory.

If the 200 parts of hydrocarbon solvent used in the example just described are replaced by 200 parts of alcohol, the reflux temperature will be about 90° C. but otherwise the reaction may be carried out in a similar manner. The yield and purity will be the same as given above.

Although the above example are confined mainly to processes starting with 1-amino-4-bromo-anthraquinone derivatives, my invention is applicable with good success to other halogen-anthraquinone compounds whose halogen atoms are reactive because of the presence of auxochromic groups in the same nucleus, for instance 1-bromo-2-amino-anthraquinone, 1,4-dihydroxy-2-chloro-anthraquinone, and others.

Any suitable unsulfonated arylamine may be used, as will be readily understood by those skilled in the art.

Although reflux temperatures have been preferred in the specific examples above indicated, higher or lower temperatures may be used, the reaction being carried out in a closed vessel if necessary, all as well understood by those skilled in the art.

Similarly it will be understood that any catalyst known in the art to promote analogous reactions, particularly copper compounds, may be used in connection with my invention.

I am aware that numerous details of the process may be varied through a wide range without departing from the principles of this invention, and I, therefore, do not purpose limiting the patent granted hereon otherwise than necessitated by the prior art.

I claim:

1. In the process of condensing an unsulfonated halogen-anthraquinone body with unsulfonated phenyl-mono-amines in the presence of an acid-absorbing agent and an amidation catalyst to produce an arylamino-anthraquinone body, the step which comprises carrying out the condensation reaction in aqueous suspension.

2. In the process of condensing an unsulfonated alpha-bromo-anthraquinone compound having an amino group in the same nucleus with the bromine atom, with unsulfonated phenyl-mono-amines in the presence of a water soluble acid-absorbing agent and an amidation catalyst, the step which comprises carrying out the condensation reaction in the presence of at least sufficient water to entirely dissolve the acid-absorbing agent.

3. A process as in claim 2, in which the acid absorbing agent is a salt of a weak acid, the salt being selected from the group consisting of ammonium salts of weak acids and salts characterized by emulsifying properties.

4. The process of producing a water-insoluble alpha-arylamino-anthraquinone body, which comprises heating together in an aqueous medium, an unsulfonated alpha-bromo-anthraquinone body having an amino group in the same nucleus with the bromine atom, an unsulfonated phenyl-mono-amine body, an acid-absorbing agent and an amidation catalyst.

5. A process as in claim 4, in which the acid absorbing agent is a salt of a weak acid, the salt being selected from the group consisting of ammonium salts of weak acids, and salts characterized by emulsifying properties.

6. The process of producing a water-insoluble alpha-arylamino-anthraquinone compound, which comprises heating together in an aqueous medium and at reflux temperature an unsulfonated 1-bromo-4-amino-anthraquinone compound, a member of the group consisting of aniline and homologs of aniline, a water soluble ammonium salt of an organic carboxylic acid and a copper catalyst.

7. In the process of condensing an unsulfonated halogen-anthraquinone body with a member of the group consisting of aniline and homologs of aniline in the presence of an acid-absorbing agent and an amidation catalyst to produce an arylamino-anthraquinone body, the step which comprises carrying out the condensation reaction in aqueous suspension.

8. The process of producing a water-insoluble alpha-arylamino-anthraquinone body which comprises heating together in an aqueous medium an unsulfonated alpha-bromo-anthraquinone body having an amino group in the same nucleus with the bromine atom, a member of the group consisting of aniline and homologs of aniline, an acid-absorbing agent and an amidation catalyst.

9. The process of producing a water-insoluble alpha-arylamino-anthraquinone compound which comprises heating together in an aqueous medium, and at reflux temperature an unsulfonated 1-bromo-4-amino-anthraquinone compound, a member of the group consisting of aniline and homologs of aniline, a soap characterized by distinctive emulsifying properties and a copper catalyst.

10. The process of producing a water-insoluble alpha-arylamino-anthraquinone compound which comprises heating together in an aqueous medium and at reflux temperature an unsulfonated 1-bromo-4-amino-anthraquinone compound, a member of the group consisting of aniline and homologs of aniline, a salt characterized by distinctive emulsifying properties and a copper catalyst.

11. In the process of condensing an unsulfonated halogen-anthraquinone body with toluidine in the presence of an acid-absorbing agent and an amidation catalyst to produce a tolylamino-anthraquinone body, the step which comprises carrying out the condensation reaction in aqueous suspension.

12. In the process of condensing an unsulfonated alpha-bromo-anthraquinone compound having an amino group in the same nucleus with the bromine atom, with toluidine in the presence of a water soluble acid-absorbing agent and an amidation catalyst, the step which comprises carrying out the condensation reaction in the presence of at least sufficient water to entirely dissolve the acid-absorbing agent.

13. The process of producing a water insoluble alpha-tolylamino-anthraquinone body which comprises heating together in aqueous medium an unsulfonated bromo-anthraquinone body having an amino group in the same nucleus with the bromine atom, toluidine, an amidation catalyst and a salt selected from the group consisting of ammonium salts of weak acids and salts characterized by emulsifying properties.

14. The process of producing a water insoluble alpha-tolylamino-anthraquinone compound which comprises heating together in an aqueous medium and at reflux temperature an unsulfonated 1-bromo-4-amino-anthraquinone compound, toluidine, a compound characterized by distinctive emulsifying properties and a copper catalyst.

15. In the process of condensing an unsulfonated halogen-anthraquinone body with unsulfonated phenyl-mono-amines in the presence of an acid-absorbing agent and an amidation catalyst to produce an arylamino-anthraquinone body, the step which comprises carrying out the condensation reaction in the presence of sufficient water to make the mixture reflux at about 102° C.

16. The process of producing a water insoluble alpha-arylamino-anthraquinone body which comprises heating together at temperatures of about 102° C. in an aqueous medium, an unsulfonated alpha-bromo-anthraquinone body having an amino group in the same nucleus with the bromine atom, an unsulfonated phenyl-mono-amine body, an acid-absorbing agent and an amidation catalyst.

17. The process of preparing 1-amino-2-bromo-4-p-tolylamino-anthraquinone which comprises heating together an aqueous solution of ammonium acetate, 1-amino-2-,4-dibromo-anthraquinone, copper acetate and para-toluidine at the reflux temperature for about four hours and isolating the reaction product by di- 18. The process of preparing 1-amino-2-methyl-4-p-tolylamino-anthraquinone in high yields and of great purity which comprises heating together about seventy parts of ammonium acetate and about two hundred parts of water, a hundred parts of 1-amino-2-methyl-4-bromo-anthraquinone, three parts of copper acetate and five hundred parts of p-toluidine at temperatures of about 102° C. for about four hours.

19. The process of preparing substantially pure 1-methyl-amino-4-p-tolyamino-anthraquinone in high yields which comprises heating together about seventy parts of ammonium acetate and about two hundred parts of water, a hundred parts of 1-methyl-amino-4-bromo-anthraquinone, three parts of copper acetate and five hundred parts of para-toluidine at the reflux temperature for about four hours.

WALTER C. MEULY.

CERTIFICATE OF CORRECTION.

Patent No. 1,931,265.                                                               October 17, 1933.

WALTER C. MEULY.

It is hereby certified that error appears in the printed specification of the above numbered patent requiring correction as follows: Page 1, line 50, for "Anthrachrione" read Anthrachinone; page 2, lines 116 and 117, for "1-amino-3, 4-dibromo-anthraquinone" read 1-amino-2, 4-dibromo-anthraquinone; page 3, line 135, for "example" read examples; and that the said Letters Patent should be read with these corrections therein that the same may conform to the record of the case in the Patent Office.

Signed and sealed this 15th day of May, A. D. 1934.

Bryan M. Battey (Seal)                                                      Acting Commissioner of Patents.